United States Patent [19]

Katan et al.

[11] Patent Number: 4,461,677

[45] Date of Patent: Jul. 24, 1984

[54] PROCESS FOR CHARGING SILVER ELECTRODES TO MONOXIDE LEVEL

[75] Inventors: Theodore Katan, Mountain View; Pamela J. Carlen, Ben Lomond, both of Calif.

[73] Assignee: The United States of America as represented by the Secretary of the Navy, Washington, D.C.

[21] Appl. No.: 510,809

[22] Filed: Jul. 5, 1983

[51] Int. Cl.$^3$ ............................................. H01M 10/44
[52] U.S. Cl. ........................................ 204/2.1; 204/57
[58] Field of Search .................... 204/2.1, 56 R, 57; 429/219

[56] References Cited

U.S. PATENT DOCUMENTS

| | | | |
|---|---|---|---|
| 3,017,448 | 1/1962 | Cahan | 136/26 |
| 3,212,934 | 10/1965 | Lander et al. | 136/30 |
| 3,353,998 | 11/1967 | Langguth et al. | 136/6 |
| 4,038,467 | 7/1977 | Lippold et al. | 429/219 |
| 4,056,664 | 11/1977 | Jaffe | 429/217 |
| 4,078,127 | 3/1978 | Megahed et al. | 429/206 |
| 4,096,328 | 6/1978 | Kayama et al. | 429/144 |
| 4,101,719 | 7/1978 | Uetani et al. | 429/206 |
| 4,121,021 | 10/1978 | Ogawa et al. | 429/162 |
| 4,250,234 | 2/1981 | Langan | 429/206 |

OTHER PUBLICATIONS

Publication "Reverse Disproportionation of AgO", by T. Katan et al., Abstract No. 69, pp. 173, 174, Oct. 11–16, 1981, Extended Abstracts of Battery Division, The Electrochemical Society, Inc.

*Primary Examiner*—Thomas Tufariello
*Attorney, Agent, or Firm*—R. F. Beers; C. D. B. Curry; W. C. Daubenspeck

[57] ABSTRACT

A method of charging silver electrodes in which an electrode of porous sintered silver is anodized in the conventional manner in alkaline electrolyte to the so-called peroxide level and usually beyond, into the oxygen-evolution level, where the majority of the silver has been electroformed into divalent silver oxide. The charged electrode is then permitted to wet stand in the electrolyte or other alkaline solution to allow the residual unanodized silver in the electrode to convert a portion of the divalent silver oxide to monovalent silver oxide by a reverse disproportionation reaction.

5 Claims, 2 Drawing Figures

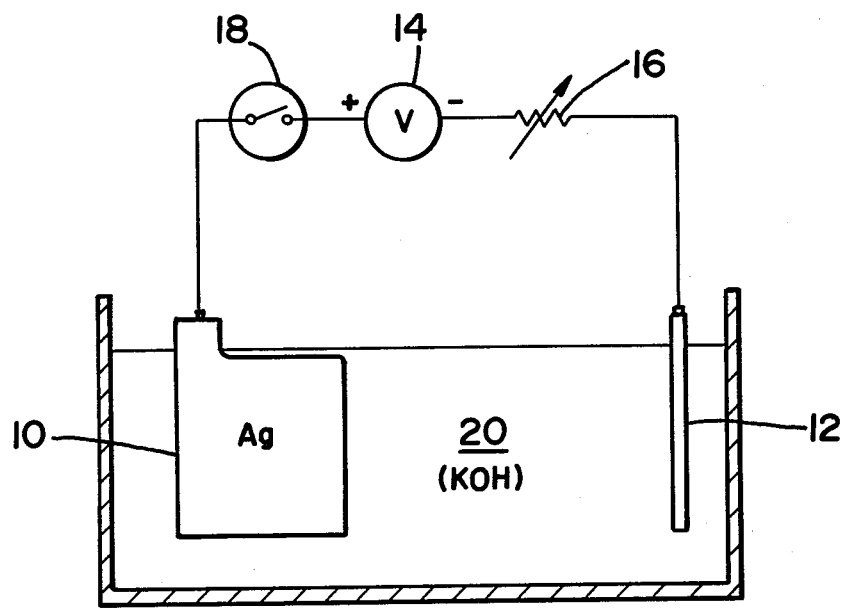
FIG _ 1
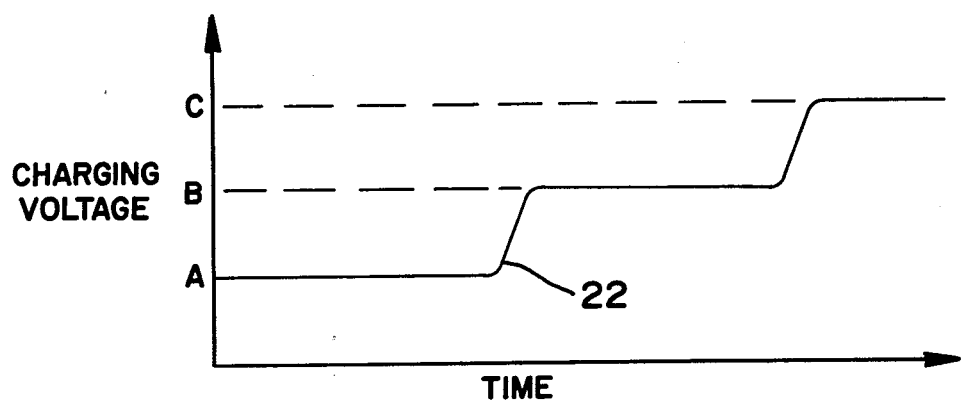
FIG _ 2

PROCESS FOR CHARGING SILVER ELECTRODES TO MONOXIDE LEVEL

BACKGROUND OF THE INVENTION

This invention relates in general to silver-oxide alkaline batteries and, in particular, to a process for making silver-oxide electrodes having a high efficiency in silver utilization.

As is well known divalent silver oxide (AgO) has a significantly higher capacity per unit weight than does monovalent silver oxide ($Ag_2O$). Thus when manufacturing high capacity batteries, especially where the weight and volume of the battery is critical as in aerospace applications, the higher capacity of divalent silver-oxide electrodes is advantageous. However, divalent silver-oxide electrodes formed by conventional anodizing of sintered silver produce a well-known voltage stabilization dip below nominal closed circuit potential when the battery load is first connected. Monovalent silver-oxide electrodes do not produce the voltage stabilization dip. Although divalent silver-oxide electrodes have a higher capacity than electrodes composed of monovalent silver oxide, the former lose capacity with age at a much greater rate. Thus where shelf life of the battery is critical, the aging characteristics of monovalent silver oxide offer advantages.

In certain aerospace applications, the silver-oxide alkaline battery for the electronics systems is not activated until immediately prior to applying the load to the battery. A voltage stabilization dip is unacceptable to the electronics and shelf-life is critical since the batteries must have a specified capacity even though the electrodes were formed long before battery activation.

In the past when making electrodes for this application, porous silver electrodes have been electroformed to the oxygen-evolution level where they exhibit the characteristics of divalent-silver oxide. In order to avoid undesirable characteristics of divalent silver oxide, the electrodes are further processed by electrochemical reduction techniques or chemical reduction techniques to convert some of the divalent silver oxide to monovalent silver oxide. In the electrochemical reduction techniques, the divalent silver-oxide electrodes are removed from the anodizing apparatus, washed, placed in a fresh electrolyte solution and backdischarged for four to six hours. In the chemical reducing technique, the anodized electrodes are placed in a hydrazine solution. Both prior art processes require substantial labor and, more importantly, result in a loss in capacity of as much as forty percent.

SUMMARY OF THE INVENTION

The present invention is an improved method of manufacturing silver-oxide electrodes which exhibit high capacity, improved aging characteristics, and do not produce a voltage stabilization dip. In the present invention, an electrode of porous sintered silver is anodized in the conventional manner in alkaline electrolyte to the so-called peroxide level and usually beyond, into the oxygen-evolution level, where the majority of the silver has been electroformed into divalent silver oxide. The charged electrode is then permitted to wet stand in the electrolyte or other alkaline solution to allow the residual unanodized silver in the electrode to convert a portion of the divalent silver oxide to monovalent silver oxide by a reverse disproportionation reaction.

The method of the present invention has the primary advantage that the conversion of divalent silver oxide to monovalent silver oxide occurs without loss of charge. In view of the fact that unactivated batteries lose approximately 2 percent of their capacity per year, the higher initial capacity results in increased battery shelf-life and fewer rejects before deployment. There is also evidence that the rate of decomposition is less with the electrodes formed by the present method.

These and other advantages of the present invention will be better understood from the following description of the preferred embodiment when considered in conjunction with the accompanying drawings.

BRIEF DESCRIPTION OF THE DRAWINGS

FIG. 1 is a schematic drawing illustrating the method for anodizing a sintered silver electrode to the oxygen evolution level.

FIG. 2 is a plot of charging voltage at constant current versus time illustrating the anodizing process.

DESCRIPTION OF THE PREFERRED EMBODIMENT

Referring now to the drawings, FIGS. 1 and 2 illustrate a conventional oxidizing method for forming silver-oxide electrodes which is employed as part of the present invention. The starting material is a porous plaque of sintered silver comprising silver particles, typically 1–10 microns in effective diameter. The sintered silver plaque is connected as the anode 10 in the charging apparatus including a cathode 12 of stainless steel, nickel, or other metal, a voltage source 14, a current regulator 16, and a switch 18. The electrodes 10 and 12 are disposed in an aqueous alkaline electrolytic solution 20 such as potassium hydroxide, usually at about 40–50 percent concentration to maximize conductivity.

The porous silver electrode 10 is oxidized at a constant current in the range of from 0.01 to 0.10 amperes per square inch of apparent surface area, with 0.025 amperes per square inch being a typical conversion rate. The oxidation of the porous silver electrode proceeds in three stages as represented by the charging voltage versus time plot of FIG. 2. The first stage of oxidation, indicated by voltage level A of the constant current curve, represents the conversion of the surface of the silver electrode 10 to monovalent silver oxide. At point 22, the surface of the electrode is covered by the monovalent silver oxide and the electrode becomes polarized. During the second stage, indicated by voltage level B, a higher voltage is required to produce the same current as the monovalent silver oxide is essentially converted to divalent silver oxide. The second stage is commonly called the peroxide level.

At the third stage, indicated by voltage level C, the electrode is essentially completely charged; that is, all of the readily available silver has been converted to divalent silver oxide. Additional charging at voltage level C results primarily in the evolution of oxygen at the anode 10. At this time, the charged electrode is approximately 70 to 80 percent divalent silver oxide with the remaining composition being about equally divided between residual silver and residual monovalent silver oxide.

In the prior art, the oxidized electrode 10 would now undergo a reduction process by back discharge or chemical reduction (as previously described) to eliminate the problems characteristic with divalent silver-oxide electrodes.

In the present invention, after the silver electrode 10 has been charged well into the peroxide level or, preferably, the oxygen-evolution level, indicated by voltage level C, the charging circuit is disconnected via switch 18 and the charged electrode 10 is permitted to wet stand in the electrolyte (or other alkaline solution). During the wet stand, a portion of the divalent silver oxide is converted to monovalent silver oxide by the residual silver remaining in the unanodized condition according to the reverse disproportionation reaction:

$$Ag + AgO = Ag_2O$$

The rate of conversion is typically about 0.65 milliampere per square inch of actual surface area in the porous electrode. The length of time of the wet stand should be sufficient to allow the formation of sufficient monovalent silver oxide to eliminate the problems associated with divalent silver-oxide electrodes and will, of course, depend on the amount of surface area of the electrode. Only a small fraction of the divalent silver oxide is converted to monovalent silver oxide, but the stabilization dip is eliminated. However, it has been found that very long wet stand times do not produce deleterious effects.

Tables 1 and 2 illustrate the performance and discharge capacity provided by the method of the present invention compared with that provided by present industrial methods.

TABLE 1

Electrochemical Properties of Typical Electrodes

| Preparation Mode | Acquired Charge (mCcm$^{-2}$) | Efficiency of Charging (percent) | OC** Voltage | CC*** Voltage |
| --- | --- | --- | --- | --- |
| As charged to AgO | 207 | 67.1 | 0.501 | 0.472 |
| Wet Stand* Method | 286 | 69.3 | 0.330 | 0.196 |
| Discharged as per typical industrial method | 122 | 36.1 | 0.222 | 0.190 |

*1 cm$^2$ electrode left in electrolyte 42 minutes after charging, before discharging at 0.7 mAcm$^{-2}$
**OC = *open circuit voltage referenced to the mercury/mecuric oxide electrode*
***CC = *closed circuit voltage (at 0.7 mAcm$^{-2}$) referenced to the mercury/mecuric oxide electrode*

TABLE 2

Electrode Capacity After Storage
(charged planar silver electrodes stored in dark at 23.2° C.)

| | Aging Characteristics, Residual Capacity (mCcm$^{-2}$) | | |
| --- | --- | --- | --- |
| Dry Storage Time | As charged to AgO | Wet Stand method* | Discharged per typical industrial |
| 0 | 207 | 286 | 122 |
| 48 hours | — | 262 | 87 |
| 240 hours | 157 | — | — |
| 2 weeks | 73 | 120 | — |

*1 cm$^2$ electrode left in electrolyte 42 minutes before removing.

The data indicate that performance is better and capacities greater, even after aging, with electrodes made according to the present invention.

Obviously, many modifications and variations of the present invention are possible in light of the above teachings. It is therefore to be understood that within the scope of the appended claims, the invention may be practiced otherwise than as described.

What is claimed is:

1. A method for making silver-oxide electrodes which comprises:
   (a) anodizing an electrode structure of porous silver in an aqueous electrolytic solution until said electrode is charged to the peroxide level;
   (b) removing the anodizing current; and
   (c) allowing said charged electrode to wet stand in said electrolytic solution to allow residual unanodized silver to convert a portion of the divalent silver oxide formed by said step of anodizing to monovalent silver oxide by reverse a disproportionation reaction.

2. A method for making silver-oxide electrodes which comprises:
   (a) applying an anodizing current between an electrode structure of porous silver and a counter electrode in an electrolytic solution,
   (b) disconnecting said anodizing current when said electrode structure is charged to the peroxide level; and
   (c) allowing said charged electrode to wet stand in said electrolytic solution to allow residual unanodized silver to convert a portion of the divalent silver oxide, formed by said step of applying an anodizing current, to monovalent silver oxide by a reverse disproportionation reaction.

3. A method as recited in claim 1 wherein said step of anodizing further includes anodizing said electrode structure of porous silver in an aqueous electrolytic solution until said electrode is charged to the oxygen evolution level.

4. A method as recited in claim 2 wherein said step of disconnecting said anodizing current comprises disconnecting said anodizing current when said electrode structure is charged to the oxygen-evolution level.

5. A method as recited in claim 1 wherein the electrolyte solution is a solution of potassium hydroxide.

* * * * *